US012217167B2

(12) United States Patent
Rhu et al.

(10) Patent No.: US 12,217,167 B2
(45) Date of Patent: Feb. 4, 2025

(54) HIGH PERFORMANCE COMPUTING SYSTEM FOR DEEP LEARNING

(71) Applicant: SAMSUNG ELECTRONICS CO., LTD., Suwon-si (KR)

(72) Inventors: Minsoo Rhu, Daejeon (KR); Youngeun Kwon, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 817 days.

(21) Appl. No.: 16/595,992

(22) Filed: Oct. 8, 2019

(65) Prior Publication Data
US 2020/0117990 A1 Apr. 16, 2020

(30) Foreign Application Priority Data
Oct. 10, 2018 (KR) .................. 10-2018-0120634

(51) Int. Cl.
*G06N 3/08* (2023.01)
*G06F 13/28* (2006.01)
*G06F 15/173* (2006.01)
*G06N 3/10* (2006.01)

(52) U.S. Cl.
CPC .............. *G06N 3/08* (2013.01); *G06F 13/28* (2013.01); *G06F 15/17375* (2013.01); *G06N 3/10* (2013.01)

(58) Field of Classification Search
CPC .......... G06N 3/08; G06N 3/10; G06N 3/0454; G06N 3/063; G06N 3/084; G06N 3/04; G06F 13/28; G06F 13/16; G06F 15/17375; G06F 15/167; G06F 15/17337
See application file for complete search history.

(56) References Cited

U.S. PATENT DOCUMENTS

| | | | |
|---|---|---|---|
| 7,484,016 B2 * | 1/2009 | Shah | G06F 13/28 710/24 |
| 8,117,137 B2 | 2/2012 | Xu et al. | |
| 8,244,930 B1 * | 8/2012 | Dykema | G06F 13/28 710/33 |

(Continued)

FOREIGN PATENT DOCUMENTS

| KR | 2017-0099848 A | 9/2017 |
|---|---|---|
| KR | 2018-0075913 A | 7/2018 |

OTHER PUBLICATIONS

M. Dehyadegari, A. Marongiu, M. R. Kakoee, S. Mohammadi, N. Yazdani and L. Benini, "Architecture Support for Tightly-Coupled Multi-Core Clusters with Shared-Memory HW Accelerators," in IEEE Transactions on Computers, vol. 64, No. 8, pp. 2132-2144, Aug. 1, 2015, doi: 10.1109/TC.2014.2360522. (Year: 2015).*

(Continued)

*Primary Examiner* — Ramon A. Mercado
(74) *Attorney, Agent, or Firm* — NSIP Law

(57) ABSTRACT

A computing system includes a host processor, a plurality of accelerators that communicate with the host processor based on a communication interface, and a plurality of memory nodes that are connected with the plurality of accelerators through an interconnection network. A first data link is established between a first accelerator of the plurality of accelerators and a first memory node of the plurality of memory nodes, and a second data link is established between the first accelerator and a second memory node of the plurality of memory nodes.

19 Claims, 9 Drawing Sheets

(56) References Cited

U.S. PATENT DOCUMENTS

| | | | |
|---|---|---|---|
| 9,912,349 B1* | 3/2018 | Ouyang | G06F 17/16 |
| 10,649,914 B1* | 5/2020 | Caccamo | G06F 9/5077 |
| 2005/0253074 A1* | 11/2005 | Jones | G06T 1/20 |
| | | | 250/363.04 |
| 2007/0208887 A1* | 9/2007 | Kim | G06F 13/28 |
| | | | 710/22 |
| 2011/0078342 A1* | 3/2011 | Siddabathuni | G06F 13/28 |
| | | | 710/52 |
| 2016/0179434 A1* | 6/2016 | Herrero Abellanas | |
| | | | G06F 3/0683 |
| | | | 711/155 |
| 2016/0292566 A1 | 10/2016 | Duranton et al. | |
| 2017/0220949 A1* | 8/2017 | Feng | H04L 41/16 |
| 2019/0073585 A1* | 3/2019 | Pu | G06N 3/0454 |
| 2019/0108152 A1* | 4/2019 | Lee | G06F 9/5038 |
| 2019/0312772 A1* | 10/2019 | Zhao | H04L 41/12 |
| 2019/0325302 A1* | 10/2019 | Savic | G06N 3/0454 |
| 2019/0347559 A1* | 11/2019 | Kang | G06N 3/063 |
| 2019/0370630 A1* | 12/2019 | Yang | G06N 3/02 |

OTHER PUBLICATIONS

G. Dimitrakopoulos et al., Microarchitecture of Network-on-Chip Routers: A Designer's Perspective, Chapter 1, 2015 (Year: 2015).*

Youngeun Kwon, et al., "Beyond the Memory Wall: A Case for Memory-centric HPC System for Deep Learning", 2018 $51^{st}$ Annual IEEE/ACM International Symposium on Microarchitecture (MICRO), pp. 1-14, Oct. 2018.

Youngeun Kwon, et al., "A Case for Memory-centric HPC System Architecture for Training Deep Neural Networks", IEEE Computer Architecture Letters, vol. 17, Apr. 5, 2018.

Minsoo Rhu, et al., "vDNN: Virtualized Deep Neural Networks for Scalable, Memory-Efficient Neural Network Design", 49th Annual IEEE/ACM International Symposium on Microarchitecture (MICRO), Oct. 2016.

Minsoo Rhu, et al., "Compressing DMA Engine: Leveraging Activation Sparsity for Training Deep Neural Networks", 2018 IEEE International Symposium on High Performance Computer Architecture, pp. 78-91, 2018.

* cited by examiner

HIGH PERFORMANCE COMPUTING SYSTEM FOR DEEP LEARNING

CROSS-REFERENCE TO RELATED APPLICATIONS

This application claims priority under 35 U.S.C. § 119 to Korean Patent Application No. 10-2018-0120634 filed on Oct. 10, 2018, in the Korean Intellectual Property Office, the disclosure of which is incorporated herein by reference in their entirety.

BACKGROUND

Embodiments of the inventive concepts described herein relate to a computing system, and more particularly, relate to a high-performance computing system for accelerating deep learning.

A computing system includes a processor for performing various operations on data. For example, the computing system may include a host processor. When the amount of data to be processed is small, the data may be processed by only one host processor. However, as the amount of data to be processed increases, there is a limitation in processing data by using only one host processor. As such, to perform distributed processing on data, the computing system may include any other processor(s) as well as the host processor.

As deep learning-based data processing increases, the computing system may include a dedicated processor for deep learning. The dedicated processor for deep learning may be referred to as an "accelerator". A host memory may be used for the accelerator to process data based on the deep learning. For example, data that are processed by the accelerator may be stored in the host memory. Alternatively, the accelerator may process data based on data stored in the host memory. In this case, data communication may be performed between the host processor and the accelerator.

However, a bandwidth of a communication path may be limited in the data communication between the host processor and the accelerator. In particular, when the number of accelerators increases, a bandwidth that one accelerator is able to use may be further limited. As such, a data communication speed between the host processor and the accelerator may decrease, and thus, a data processing speed of the accelerator may decrease.

SUMMARY

Example embodiments of the inventive concepts provide a computing system capable of processing data quickly without using a host memory when an accelerator processes data.

A computing system according to an example embodiment of the inventive concepts includes a host processor, a plurality of accelerators that communicate with the host processor based on a communication interface, and a plurality of memory nodes that are connected with the plurality of accelerators through an interconnection network. A first data link is established between a first accelerator of the plurality of accelerators and a first memory node of the plurality of memory nodes, and a second data link is established between the first accelerator and a second memory node of the plurality of memory nodes.

In an example embodiment, a third data link may be established between a second accelerator of the plurality of accelerators and the first memory node, and a fourth data link may be established between the second accelerator and a third memory node of the plurality of memory nodes.

In an example embodiment, the first accelerator and the second accelerator may directly exchange data through the first memory node.

In an example embodiment, the first memory node may include a first memory module that stores data transferred from the first accelerator through the first data link or transfers stored data to the first accelerator through the first data link, and a second memory module that stores data transferred from the second accelerator through the third data link or transfers stored data to the second accelerator through the third data link.

In an example embodiment, the first memory module may include a first direct memory access (DMA) engine allowing the first accelerator to directly access the first memory module, and the second memory module may include a second DMA engine allowing the second accelerator to directly access the second memory module.

In an example embodiment, the first memory node may further include a protocol engine that transfers data stored in the first memory module and the second memory module in compliance with a particular protocol.

In an example embodiment, the first memory node may further include an encoder that encodes data stored in the first memory module and the second memory module.

In an example embodiment, the first memory node may further include a compressor that compresses data stored in the first memory module and the second memory module.

In an example embodiment, the interconnection network may include a ring network.

In an example embodiment, the first accelerator may perform deep learning by using the first memory node and the second memory node.

A computing system according to an example embodiment of the inventive concepts includes a host processor that generates a learning command for a plurality of input data, a first accelerator that performs an operation on first input data of the plurality of input data based on neural network variables in response to the learning command and generates a first operation result and a second operation result, a first memory node that stores the first operation result transferred from the first accelerator through a first data link, and a second memory node that stores the second operation result transferred from the first accelerator through a second data link.

In an example embodiment, the computing system may further include a second accelerator that performs an operation on second input data of the plurality of input data based on neural network variables in response to the learning command and generates a third operation result and a fourth operation result, and a third memory node that stores the fourth operation result transferred from the second accelerator through a third data link. The first memory node may store the third operation result transferred from the second accelerator through a fourth data link.

In an example embodiment, the first memory node may include a first memory module that stores the first operation result through the first data link, and a second memory module that stores the third operation result through the fourth data link.

In an example embodiment, the first memory module may include a first direct memory access (DMA) engine allowing the first accelerator to directly access the first memory module, and the second memory module may include a second DMA engine allowing the second accelerator to directly access the second memory module.

In an example embodiment, the first memory node may further include a protocol engine that transfers the first operation result stored in the first memory module to the first accelerator and the third operation result stored in the second memory module to the second accelerator in compliance with a particular protocol.

In an example embodiment, the first accelerator may update the neural network variables by using the first operation result stored in the first memory node and the second operation result stored in the second memory node.

A computing system according to an example embodiment of the inventive concepts includes a host processor, a plurality of accelerators that communicate with the host processor based on a communication interface, and a plurality of memory nodes that are connected with the plurality of accelerators through an interconnection network. A first data link is established between a first accelerator of the plurality of accelerators and a first memory node of the plurality of memory nodes, and a second data link is established between the first memory node and a second accelerator of the plurality of accelerators.

In an example embodiment, the first accelerator and the second accelerator may directly exchange data through the first memory node.

In an example embodiment, the first memory node may include a first memory module that stores data transferred from the first accelerator through the first data link or transfers stored data to the first accelerator through the first data link, and a second memory module that stores data transferred from the second accelerator through the second data link or transfers stored data to the second accelerator through the second data link.

In an example embodiment, the first memory module may include a first direct memory access (DMA) engine allowing the first accelerator to directly access the first memory module, and the second memory module may include a second DMA engine allowing the second accelerator to directly access the second memory module.

BRIEF DESCRIPTION OF THE FIGURES

The above and other objects and features of the inventive concepts will become apparent by describing in detail exemplary embodiments thereof with reference to the accompanying drawings.

DETAILED DESCRIPTION

Below, embodiments of the inventive concepts may be described in detail and clearly to such an extent that an ordinary one in the art easily implements the inventive concepts.

Figure 1:
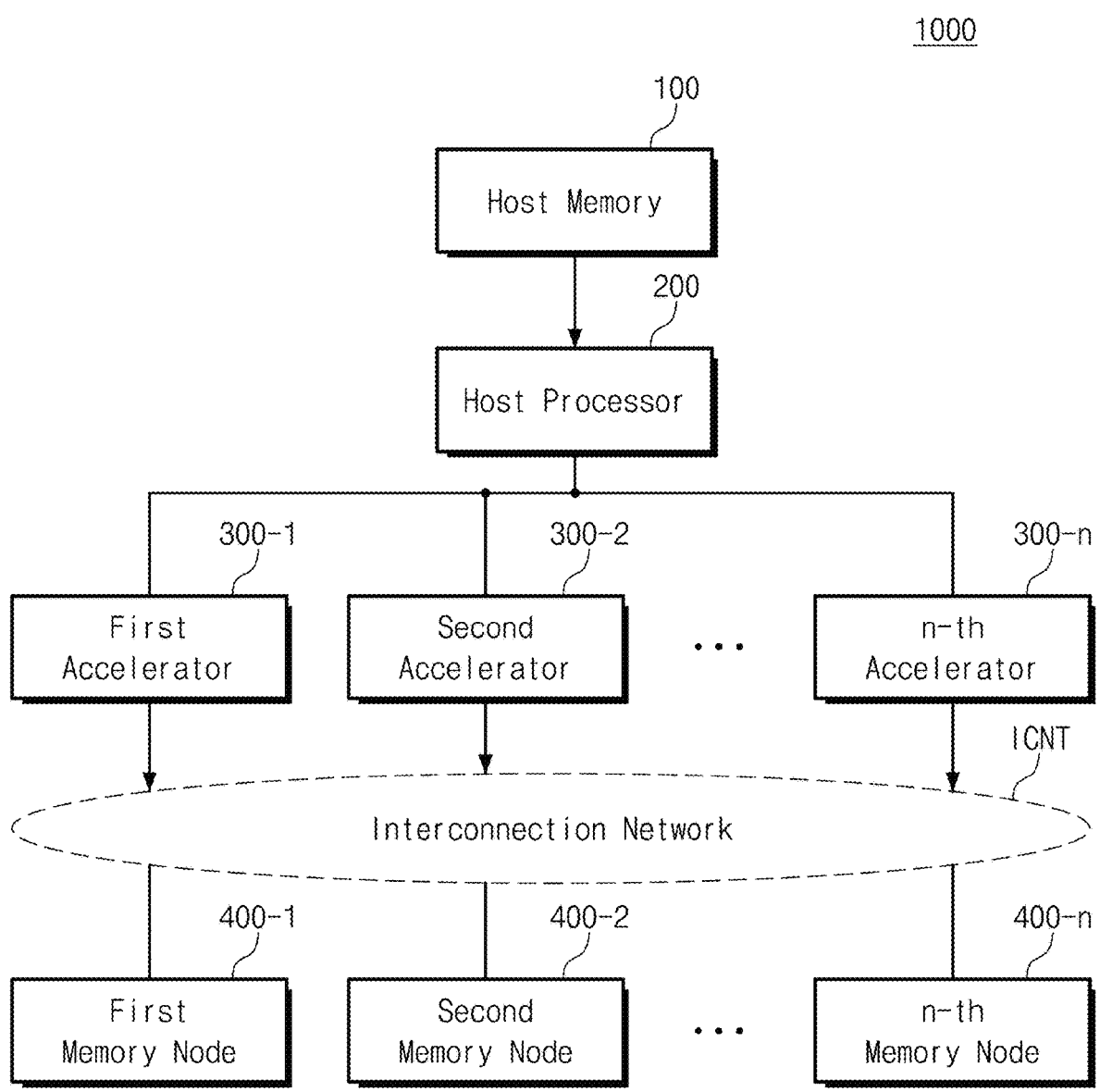
FIG. 1 is a block diagram illustrating an exemplary configuration of a computing system according to an example embodiment of the inventive concepts.

FIG. 1 is a block diagram illustrating an exemplary configuration of a computing system according to an example embodiment of the inventive concepts. For example, a computing system 1000 may be implemented in electronic devices such as a desktop computer, a laptop computer, a tablet computer, a smartphone, a wearable device, a video game console, a server, an electric vehicle, home appliances, and a medical device.

Referring to FIG. 1, the computing system 1000 may include a host memory 100, a host processor 200, a plurality of accelerators 300-1 to 300-n (n being an integer greater than "0"), and a plurality of memory nodes 400-1 to 400-n. The components of the computing system 1000 may be included in one electronic device or may be distributed on different electronic devices. The components of the computing system 1000 may be implemented on one chip or package (e.g., a single system-on-chip (SoC)), or each of the components may be implemented on a separate chip or package.

The computing system 1000 may be divided into a host device and a peripheral device. The host device may control overall operations of the computing system 1000. For example, the host device may control an operation of the peripheral device. The peripheral device may perform a particular function under control of the host device. For example, the host memory 100 and the host processor 200 may be included in the host device, and the accelerators 300-1 to 300-n and the memory nodes 400-1 to 400-n may be included in the peripheral device.

The host memory 100 may store data associated with an operation of the host device. For example, the host memory 100 may store data to be processed by the host processor 200 or may store data processed by the host processor 200.

The host memory 100 may operate as a main memory. For example, the host memory 100 may include a volatile memory such as a dynamic random access memory (DRAM) or a static RAM (SRAM). However, the inventive concepts are not limited thereto. For example, the host memory 100 may include a nonvolatile memory such as a flash memory, a magnetic RAM (MRAM), a phase-change RAM (PRAM), a ferroelectric RAM (FRAM), or a resistive RAM (RRAM).

The host processor 200 may control overall operations of the computing system 1000. For example, the host processor 200 may control operations of the accelerators 300-1 to 300-n. The host processor 200 may process data stored in the host memory 100 and may store the processed data in the host memory 100. For example, the host processor 200 may be a main processor such as a central processing unit (CPU) or an application processor (AP).

The accelerators 300-1 to 300-n may process data by performing various operations on data. The accelerators 300-1 to 300-n may perform a particular function through data processing. For example, the accelerators 300-1 to 300-n may perform deep learning by processing data based on a neural network. In this case, each of the accelerators 300-1 to 300-n may be a graphic processing unit (GPU) or a deep learning accelerator.

The accelerators 300-1 to 300-n may operate in response to a command of the host processor 200. When a command for processing data is provided from the host processor 200, the accelerators 300-1 to 300-n may process data. The accelerators 300-1 to 300-n may provide a processing result to the host processor 200.

The accelerators 300-1 to 300-n may provide the processing result to the host processor 200 based on a particular communication interface. The accelerators 300-1 to 300-n may receive data or a command from the host processor 200 based on the particular communication interface. For example, the particular communication interface may be a peripheral component interconnect express (PCIe) interface. Each of the accelerators 300-1 to 300-n may be connected to the host device through a socket or a port that is based on the particular communication interface. As such, the accelerators 300-1 to 300-n and the host processor 200 may exchange data.

The accelerators 300-1 to 300-n may be connected to the memory nodes 400-1 to 400-n through an interconnection network ICNT. The interconnection network ICNT may provide a data transmission path between the accelerators 300-1 to 300-n and the memory nodes 400-1 to 400-n. The data transmission path may be referred to as a "data link". When data links established between the accelerators 300-1 to 300-n and the memory nodes 400-1 to 400-n are different, a configuration of the interconnection network ICNT may change. That is, a connection state of the accelerators 300-1 to 300-n and the memory nodes 400-1 to 400-n may vary depending on the interconnection network ICNT.

For example, the interconnection network ICNT may be configured to have a fixed network topology in the phase of implementing the computing system 1000. Alternatively, the interconnection network ICNT may be configured to have a variable network topology in which data links are differently established through switching.

For example, the first accelerator 300-1 may be connected to the first memory node 400-1 and the second memory node 400-2 depending on the interconnection network ICNT. In this case, when processing data, the first accelerator 300-1 may use the first memory node 400-1 and the second memory node 400-2. The first accelerator 300-1 may store an operation result, which is generated while processing data, in the first memory node 400-1 or the second memory node 400-2. The first accelerator 300-1 may process data based on the operation result stored in the first memory node 400-1 or the second memory node 400-2.

The memory nodes 400-1 to 400-n may include a plurality of memory devices storing data. The memory nodes 400-1 to 400-n may be connected to the accelerators 300-1 to 300-n through the interconnection network ICNT. The memory nodes 400-1 to 400-n and the accelerators 300-1 to 300-n that are interconnected may transfer data based on a particular protocol.

In an example embodiment, the accelerators 300-1 to 300-n may directly access the memory nodes 400-1 to 400-n connected through the interconnection network ICNT. The accelerators 300-1 to 300-n may directly write data in the memory nodes 400-1 to 400-n or may directly read data stored in the memory nodes 400-1 to 400-n. As such, the accelerators 300-1 to 300-n may access the memory nodes 400-1 to 400-n without passing through the host processing.

That is, when data are transferred between the accelerators 300-1 to 300-n and the memory nodes 400-1 to 400-n, a host resource may not be used.

For example, when the accelerators 300-1 to 300-n process a huge amount of data, the accelerators 300-1 to 300-n may use an external memory as well as an internal memory. In this case, the accelerators 300-1 to 300-n may use the memory nodes 400-1 to 400-n instead of the host memory 100.

Assumed that the memory nodes 400-1 to 400-n do not exist, the accelerators 300-1 to 300-n may process data by using the host memory 100. For example, the accelerators 300-1 to 300-n may store operation results, which are generated upon processing data, in the host memory 100. The accelerators 300-1 to 300-n may process data by using the operation results stored in the host memory 100. In this case, through a bus, the accelerators 300-1 to 300-n may transfer data to the host processor 200 or may receive data from the host processor 200. When the accelerators 300-1 to 300-n transfer data to the host processor 200 in parallel or receive data from the host processor 200 in parallel, a time delay (or a latency) may occur due to a limitation on a bus bandwidth when data are transferred. That is, when the accelerators 300-1 to 300-n process data by using a host resource, a data processing speed may become slow due to a limitation on a bandwidth. Also, as the amount of a host resource used increases, a processing speed of the host processor 200 may become slower.

In contrast, as illustrated in FIG. 1, when the memory nodes 400-1 to 400-n are connected to the accelerators 300-1 to 300-n through the interconnection network ICNT, the accelerators 300-1 to 300-n may process data without using the host memory 100. For example, the accelerators 300-1 to 300-n may process data by using the memory nodes 400-1 to 400-n. The accelerators 300-1 to 300-n may store operation results, which are generated upon processing data, in the memory nodes 400-1 to 400-n. The accelerators 300-1 to 300-n may process data by using the operation results stored in the memory nodes 400-1 to 400-n. In this case, the accelerators 300-1 to 300-n may access the memory nodes 400-1 to 400-n through different data links. Because a data link has a fixed bandwidth, even though the accelerators 300-1 to 300-n access the memory nodes 400-1 to 400-n in parallel, a time delay (or a latency) may not occur. Accordingly, a data processing speed of the accelerators 300-1 to 300-n may be improved.

As described above, the computing system 1000 according to an example embodiment of the inventive concepts may include the accelerators 300-1 to 300-n and the memory nodes 400-1 to 400-n. The accelerators 300-1 to 300-n may process data through the memory nodes 400-1 to 400-n without using a host resource. Also, the accelerators 300-1 to 300-n and the memory nodes 400-1 to 400-n may exchange data with a high bandwidth. As such, a data processing speed of the accelerators 300-1 to 300-n may be improved. That is, there may be implemented the computing system 1000 in which a data processing speed of the accelerators 300-1 to 300-n may be improved.

An example is illustrated in FIG. 1 as the computing system 1000 includes the accelerators 300-1 to 300-n and the memory nodes 400-1 to 400-n being identical in number, but the inventive concepts are not limited thereto. For example, the computing system 1000 may include accelerators and memory nodes being different in number.

Figure 2:
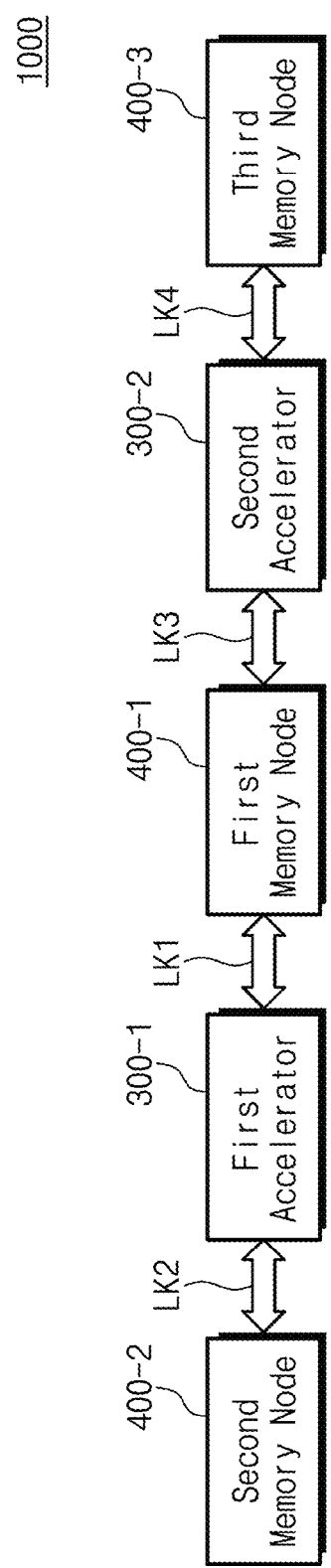
FIG. 2 is a diagram illustrating an exemplary connection state of accelerators and memory nodes of FIG. 1.

FIG. 2 is a diagram illustrating an exemplary connection state of accelerators and memory nodes of FIG. 1. Referring to FIG. 2, the first accelerator 300-1 is connected to the first memory node 400-1 through a first data link LK1 and is connected to the second memory node 400-2 through a second data link LK2. The second accelerator 300-2 is connected to the first memory node 400-1 through a third data link LK3 and is connected to the third memory node 400-3 through a fourth data link LK4.

Each of the first to fourth data links LK1 to LK4 may transfer data bidirectionally. For example, the first accelerator 300-1 may receive data from the first memory node 400-1 through the first data link LK1 while transferring data to the first memory node 400-1 through the first data link LK1.

The first accelerator 300-1 may access the first memory node 400-1 and the second memory node 400-2 in parallel. As such, the first accelerator 300-1 may transfer or receive data with a bandwidth corresponding to a sum of a bandwidth of the first data link LK1 and a bandwidth of the second data link LK2. For example, when the bandwidth of each of the first data link LK1 and the second data link LK2 is 75 GB/sec, the first accelerator 300-1 may transfer or receive data at 150 GB/sec.

Likewise, the second accelerator 300-2 may access the first memory node 400-1 and the third memory node 400-3 in parallel. As such, the second accelerator 300-2 may transfer or receive data with a bandwidth corresponding to a sum of a bandwidth of the third data link LK3 and a bandwidth of the fourth data link LK4.

When processing data, the first accelerator 300-1 may use the first memory node 400-1 and the second memory node 400-2. The first accelerator 300-1 may store operation results, which are generated while processing data, in the first memory node 400-1 and/or the second memory node 400-2. The first accelerator 300-1 may process data by using the operation results stored in the first memory node 400-1 and/or the second memory node 400-2.

When processing data, the second accelerator 300-2 may use the first memory node 400-1 and the third memory node 400-3. The second accelerator 300-2 may store operation results, which are generated while processing data, in the first memory node 400-1 and/or the third memory node 400-3. The second accelerator 300-2 may process data by using the operation results stored in the first memory node 400-1 and/or the third memory node 400-3.

As illustrated in FIG. 2, the first memory node 400-1 may be connected to the first accelerator 300-1 and the second accelerator 300-2. The first accelerator 300-1 may store data in the first memory node 400-1 through the first data link LK1, and the data stored in the first memory node 400-1 may be transferred to the second accelerator 300-2 through the third data link LK3. As such, the first accelerator 300-1 may transfer data to the second accelerator 300-2 through the first memory node 400-1. Likewise, the second accelerator 300-2 may transfer data to the first accelerator 300-1 through the first memory node 400-1. That is, the first accelerator 300-1 and the second accelerator 300-2 may exchange data.

An example is illustrated in FIG. 2 as an accelerator according to an example embodiment of the inventive concepts is connected to two memory nodes, but the inventive concepts are not limited thereto. For example, an accelerator according to an example embodiment of the inventive concepts may be connected to three or more memory nodes. Alternatively, an accelerator according to an example embodiment of the inventive concepts may be connected to one memory node.

According to another embodiment of the inventive concepts, some of a plurality of accelerators may be connected to at least one memory node, and some accelerators may be connected to any other accelerators. In this case, an accelerator that is not directly connected to a memory node may access a memory node through another accelerator. Also, when an accelerator is directly connected to another accelerator, accelerators may directly exchange data without using a memory node. As described above, an accelerator according to an example embodiment of the inventive concepts may be connected to memory nodes. An accelerator may be connected to memory nodes through separate data links. Each data link may transfer data with a given bandwidth. An accelerator may transfer data to memory nodes through data links in parallel. Accordingly, an accelerator may transfer data with a high bandwidth. Likewise, an accelerator may receive data with a high bandwidth. This may mean that a data processing speed of an accelerator according to an example embodiment of the inventive concepts may be improved.

An example is illustrated in FIG. 2 as only one data link is present between an accelerator and a memory node, but the inventive concepts are not limited thereto. For example, when a bandwidth of a data link is not a required bandwidth, a plurality of data links may be established between an accelerator and a memory node. That is, the number of data links between an accelerator and a memory node may vary depending on a bandwidth of a data link.

Figure 3:
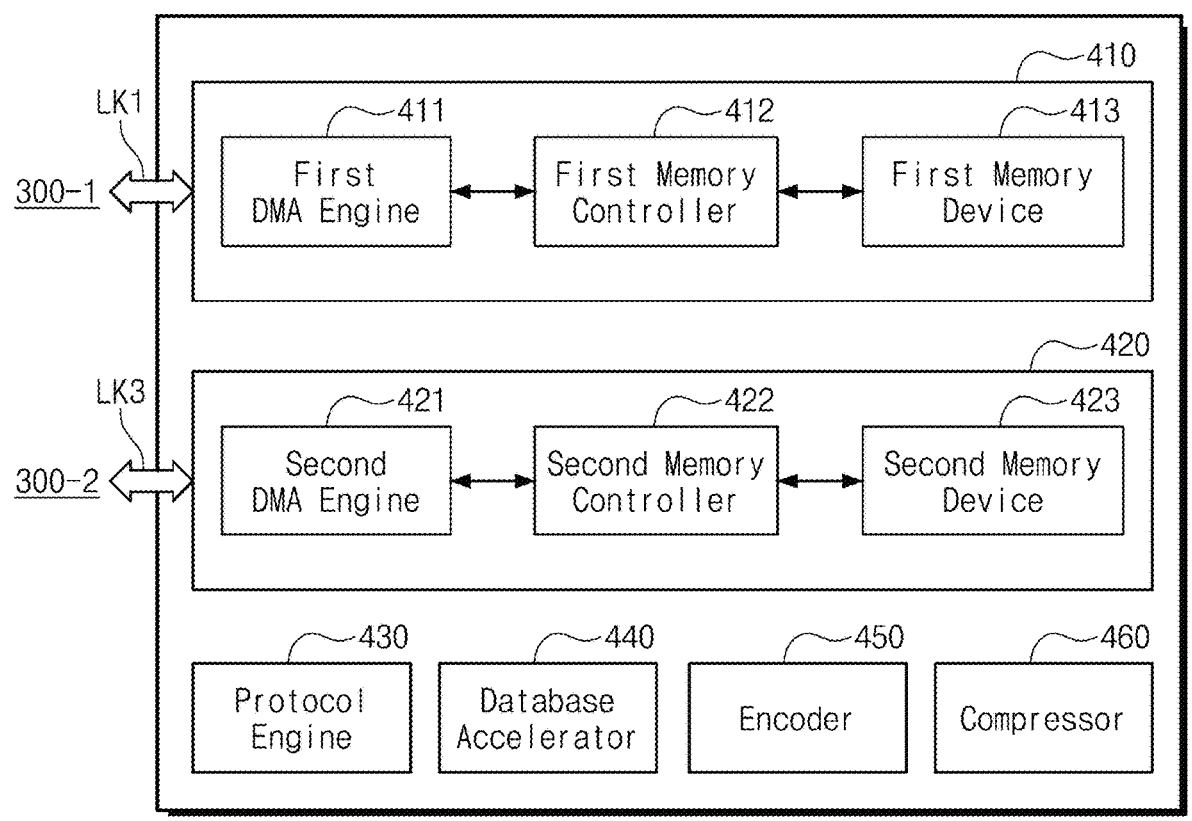
FIG. 3 is a block diagram illustrating an exemplary configuration of a memory node of FIG. 1.

FIG. 3 is a block diagram illustrating an exemplary configuration of a memory node of FIG. 1. For convenience of description, a description will be given under the assumption that a memory node according to an example embodiment of the inventive concepts is the first memory node 400-1. That is, each of memory nodes according to an example embodiment of the inventive concepts may have the same configuration as the first memory node 400-1.

Referring to FIG. 3, the first memory node 400-1 may include a first memory module 410, a second memory module 420, a protocol engine 430, a database accelerator 440, an encoder 450, and a compressor 460.

Through the first data link LK1, the first memory module 410 may store data transferred from the first accelerator 300-1 or may transfer the stored data to the first accelerator 300-1.

The first memory module 410 may include a first direct memory access (DMA) engine 411, a first memory controller 412, and a first memory device 413. The first DMA engine 411 may allow the first accelerator 300-1 to directly access the first memory module 410. For example, the first DMA engine 411 may transfer a write command and data transferred through the first data link LK1 to the first memory controller 412. The first memory controller 412 may store the transferred data in the first memory device 413 in response to the write command. The first DMA engine 411 may transfer a read command transferred through the first data link LK1 to the first memory controller 412. The first memory controller 412 may output data stored in the first memory device 413 in response to the read command. The output data may be transferred to the first accelerator 300-1 through the first data link LK1.

Through the third data link LK3, the second memory module 420 may store data transferred from the second accelerator 300-2 or may transfer the stored data to the second accelerator 300-2.

The second memory module 420 may include a second DMA engine 421, a second memory controller 422, and a second memory device 423. The second DMA engine 421 may allow the second accelerator 300-2 to directly access the second memory module 420. For example, the second DMA engine 421 may transfer a write command and data transferred through the third data link LK3 to the second memory controller 422. The second memory controller 422 may store the transferred data in the second memory device 423 in response to the write command. The second DMA engine 421 may transfer a read command transferred through the third data link LK3 to the second memory controller 422. The second memory controller 422 may output data stored in the second memory device 423 in response to the read command. The output data may be transferred to the second accelerator 300-2 through the third data link LK3.

Each of the first memory device 413 and the second memory device 423 may include a plurality of memory chips or a plurality of memory dies. Each of the first memory device 413 and the second memory device 423 may include a volatile memory device such as a dynamic random access memory (DRAM) device or a static random access memory (SRAM) device and/or a nonvolatile memory device such as a flash memory device, a magnetic RAM (MRAM) device, a phase-change RAM (PRAM) device, a ferroelectric RAM (FRAM) device, or a resistive RAM (RRAM) device.

An example is illustrated in FIG. 3 as data stored in the first memory device 413 are transferred to the first accelerator 300-1 through the first data link LK1, but the inventive concepts are not limited thereto. For example, data stored in the first memory device 413 may be transferred to the second accelerator 300-2 through the third data link LK3. Likewise, data stored in the second memory device 423 may be transferred to the first accelerator 300-1 through the first data link LK1. In this case, the first memory node 400-1 may further include a separate circuit that is able to change a data transmission path. When data stored in the first memory device 413 are transferred to the second accelerator 300-2 through the third data link LK3, the second accelerator 300-2 may receive data from the first accelerator 300-1 without using a host resource. That is, the first accelerator 300-1 and the second accelerator 300-2 may directly communicate through the first memory node 400-1.

The protocol engine 430 may transfer data stored in the first memory node 400-1 in compliance with a particular protocol or may receive data transferred in compliance with the particular protocol. The particular protocol may be a communication rule that is in advance determined for data transmission between an accelerator and a memory node. When data are transferred in compliance with the particular protocol, the data links LK1 and LK3 may transfer data with a maximum bandwidth.

The database accelerator 440 may process or manage data such that data may be efficiently stored in the first memory node 400-1. For example, the database accelerator 440 may pre-process data transferred to the first memory node 400-1. The first memory device 413 or the second memory device 423 may store the pre-processed data.

The encoder 450 may encode the data stored in the first memory node 400-1. As such, the encoded data may be transferred from the first memory node 400-1 to the accelerators 300-1 and 300-2.

The compressor 460 may compress the data stored in the first memory node 400-1. As such, the compressed data may be transferred from the first memory node 400-1 to the accelerators 300-1 and 300-2.

An example is illustrated in FIG. 3 as the first memory node 400-1 includes the two memory modules 410 and 420, but the inventive concepts are not limited thereto. For example, when the number of accelerators connectible to the first memory node 400-1 is "m", the first memory node 400-1 may include "m" memory modules.

An example is illustrated in FIG. 3 as the number of data links LK1 and LK3 correspond to the number of memory modules 410 and 420, but the inventive concepts are not limited thereto. For example, six data links may be established between the first memory node 400-1 and the first and second accelerators 300-1 and 300-2. In this case, the first memory module 410 may be connected to the first accelerator 300-1 through three data links, and the second memory module 420 may be connected to the second accelerator 300-2 through three data links.

As described above, a memory node according to an example embodiment of the inventive concepts may include a plurality of memory modules. An accelerator connected to a memory node may directly access a memory module through a DMA engine of each of the memory modules. Accordingly, an accelerator may use a memory node without using a host resource.

Also, data stored in a memory node may be transferred to a plurality of accelerators through data links. Accordingly, a plurality of accelerators may perform data communication through a memory node.

Components included in a memory node according to an example embodiment of the inventive concepts may be implemented in the form of software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a microelectromechanical system (MEMS), a passive element, or a combination thereof.

Figure 4:
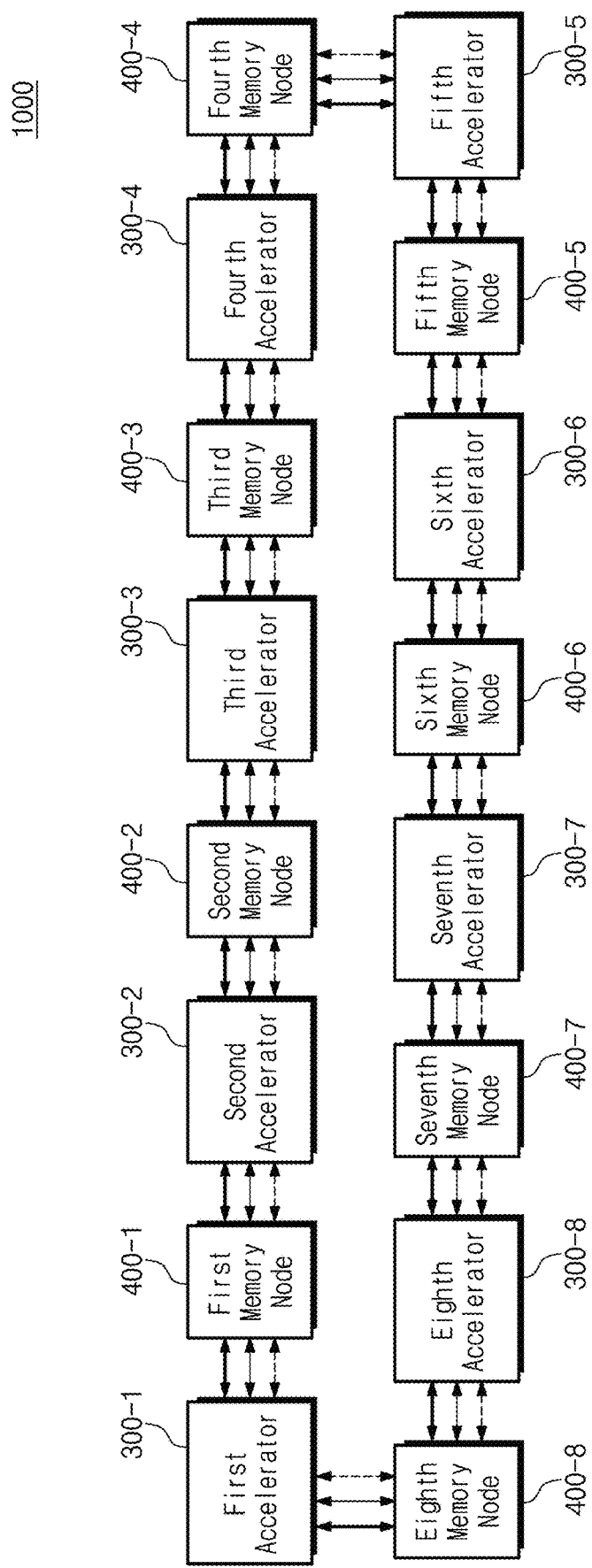
FIG. 4 is a diagram illustrating an example of an interconnection network of FIG. 1.

FIG. 4 is a diagram illustrating an example of an interconnection network of FIG. 1. Referring to FIG. 4, the computing system 1000 may include first to eighth accelerators 300-1 to 300-8 and first to eighth memory nodes 400-1 to 400-8. Each of the accelerators 300-1 to 300-8 may be connected to two memory nodes, and each of the memory nodes 400-1 to 400-8 may be connected to two accelerators. For example, the first accelerator 300-1 may be connected to the first memory node 400-1 and the eighth memory node 400-8. The first memory node 400-1 may be connected to the first accelerator 300-1 and the second accelerator 300-2. As illustrated in FIG. 4, when the accelerators 300-1 to 300-8 and the memory nodes 400-1 to 400-8 are connected in the shape of a ring (i.e., a circle chain shape), an interconnection network may be a ring network.

In the case of failing to secure a required bandwidth through one data link, as illustrated in FIG. 4, three data links may be established between one accelerator and one memory node. For example, three data links may be established between the first accelerator 300-1 and the first memory node 400-1. In this case, the first accelerator 300-1 and the first memory node 400-1 may transfer data in parallel through the three data links.

For example, when a bandwidth of one data link is 25 GB/sec, one accelerator and one memory node may transfer data with a bandwidth of 75 GB/sec. Because one accelerator is connected to two memory nodes, one accelerator may transfer data to memory nodes or may receive data from memory nodes with a bandwidth of 150 GB/sec. Accordingly, as illustrated in FIG. 4, the computing system 1000 in which the eight accelerators 300-1 to 300-8 are included may have a bandwidth of 1200 GB/sec.

An example is illustrated in FIG. 4 as the eight accelerators 300-1 to 300-8 and the eight memory nodes 400-1 to 400-8 are connected through the ring network, but the inventive concepts are not limited thereto. In the computing system 1000 according to an example embodiment of the inventive concepts, the numbers of accelerators and memory nodes connected through the ring network may be variously determined.

Figure 5:
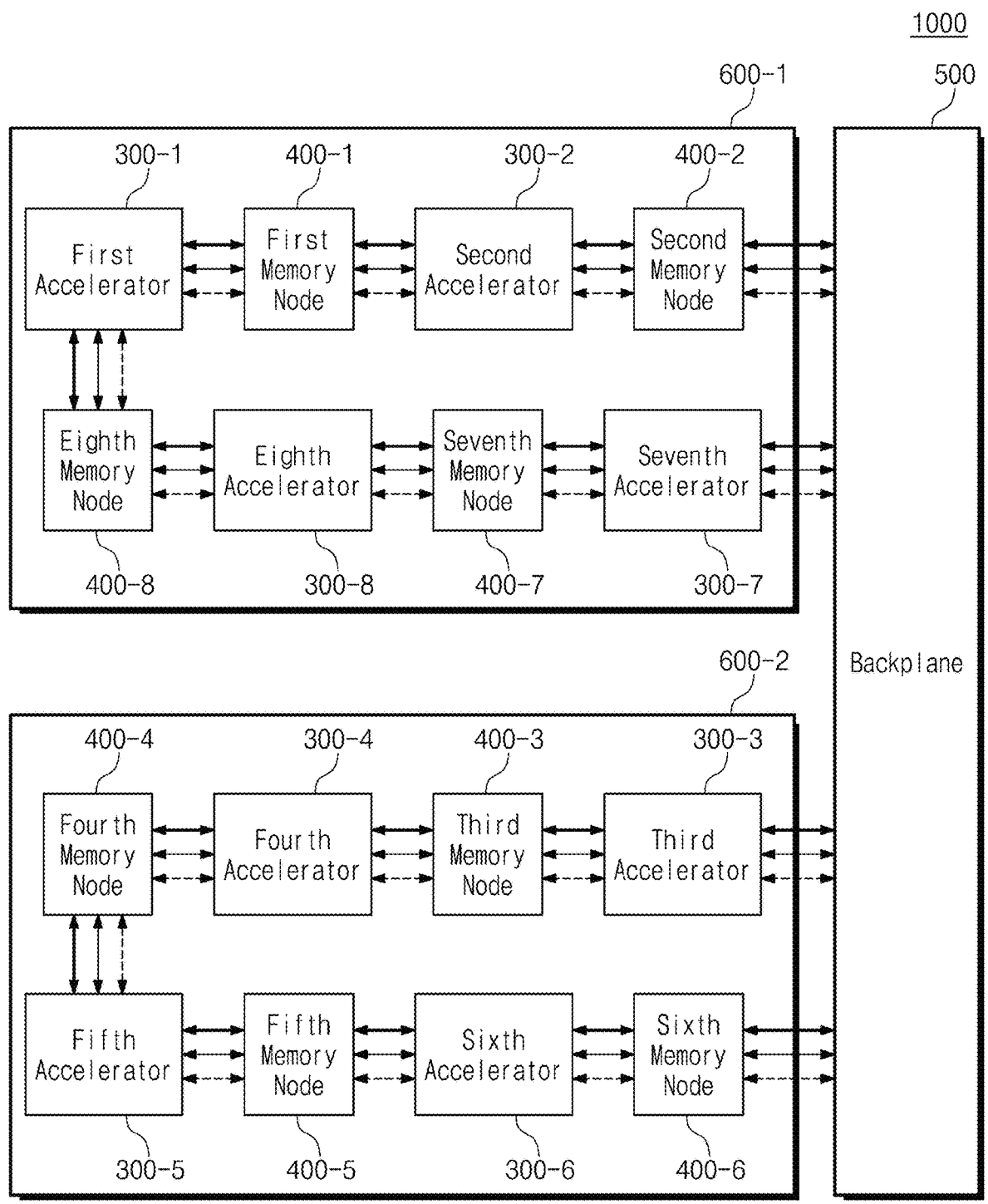
FIG. 5 is a diagram illustrating an application example of a computing system according to an interconnection network of FIG. 4.

FIG. 5 is a diagram illustrating an application example of a computing system according to an interconnection network of FIG. 4. In detail, FIG. 5 illustrates an example in which the computing system 1000 is implemented at a server. Referring to FIG. 5, the computing system 1000 may include a backplane 500, a first server chassis 600-1, and a second server chassis 600-2. The first to eighth accelerators 300-1 to 300-8 and the first to eighth memory nodes 400-1 to 400-8 may be distributed into the first server chassis 600-1 and the second server chassis 600-2. For example, as illustrated in FIG. 5, the first accelerator 300-1, the second accelerator 300-2, the seventh accelerator 300-7, the eighth accelerator 300-8, the first memory node 400-1, the second memory node 400-2, the seventh memory node 400-7, and the eighth memory node 400-8 may be disposed at the first server chassis 600-1.

The backplane 500 may transfer data between devices disposed at the first server chassis 600-1 and devices disposed at the second server chassis 600-2. That is, the backplane 500 may connect the devices of the first server chassis 600-1 and the devices of the second server chassis 600-2. For example, the backplane 500 may connect the second memory node 400-2 and the third accelerator 300-3 and may connect the sixth memory node 400-6 and the seventh accelerator 300-7. In this case, the accelerators 300-1 to 300-8 and the memory nodes 400-1 to 400-8 of FIG. 5 may be connected through a rink network, like the interconnection network ICNT described with reference to FIG. 4.

As illustrated in FIG. 5, when the computing system 1000 according to an example embodiment of the inventive concepts is implemented at a server, the computing system 1000 may include a ring network like the computing system 1000 of FIG. 4. As such, the computing system 1000 of FIG. 5 may have the same bandwidth as the computing system 1000 of FIG. 4.

An example is illustrated in FIG. 5 as the accelerators 300-1 to 300-8 and the memory nodes 400-1 to 400-8 are disposed at the two server chassis 600-1 and 600-2, but the inventive concepts are not limited thereto. For example, both the accelerators 300-1 to 300-8 and the memory nodes 400-1 to 400-8 may be disposed at the first server chassis 600-1. The number of accelerators capable of being disposed at one server chassis and the number of memory nodes capable of disposed at one server chassis may vary depending on a size or standard of a server chassis. Also, the number of server chassis may vary depending on the number of accelerators and the number of memory nodes.

According to an example embodiment of the inventive concepts, the deep learning may be performed on input data based on the computing system 1000. The deep learning may be a machine learning method that is used to classify input data based on a neural network. For example, through the deep learning, the computing system 1000 may identify an object of image data or may classify the object.

The deep learning may include a training operation and an inference operation for input data. The computing system 1000 may update variables of the neural network through the learning of the input data. For example, the variables of the neural network may include a weight, a bias, etc. The computing system 1000 may perform inference on the input data based on the variables of the neural network determined through the learning. The computing system 1000 may identify or classify the input data through the inference.

In the learning process, the computing system 1000 may update the variables of the neural network based on various input data. The computing system 1000 may perform the learning through the accelerators 300-1 to 300-n. Various input data may be distributed and processed in the accelerators 300-1 to 300-n. The accelerators 300-1 to 300-n may process the input data by using the memory nodes 400-1 to 400-n. When the memory nodes 400-1 to 400-n are used, the accelerators 300-1 to 300-n may perform the learning operation without using a host resource. Accordingly, in the learning operation, a time delay (or a latency) due to an increase in the amount of host resource used may not occur.

Below, a deep learning operation of the computing system 1000 will be more fully described with reference to FIGS. 6A to 8. For convenience of description, it is assumed that the deep learning is performed by using the first and second accelerators 300-1 and 300-2 and the first to third memory nodes 400-1 to 400-3 as illustrated in FIG. 2. However, the inventive concepts are not limited thereto. For example, in the computing system 1000, the number of accelerators for the deep learning and the number of memory nodes for the deep learning may be variously determined.

Figure 6A:
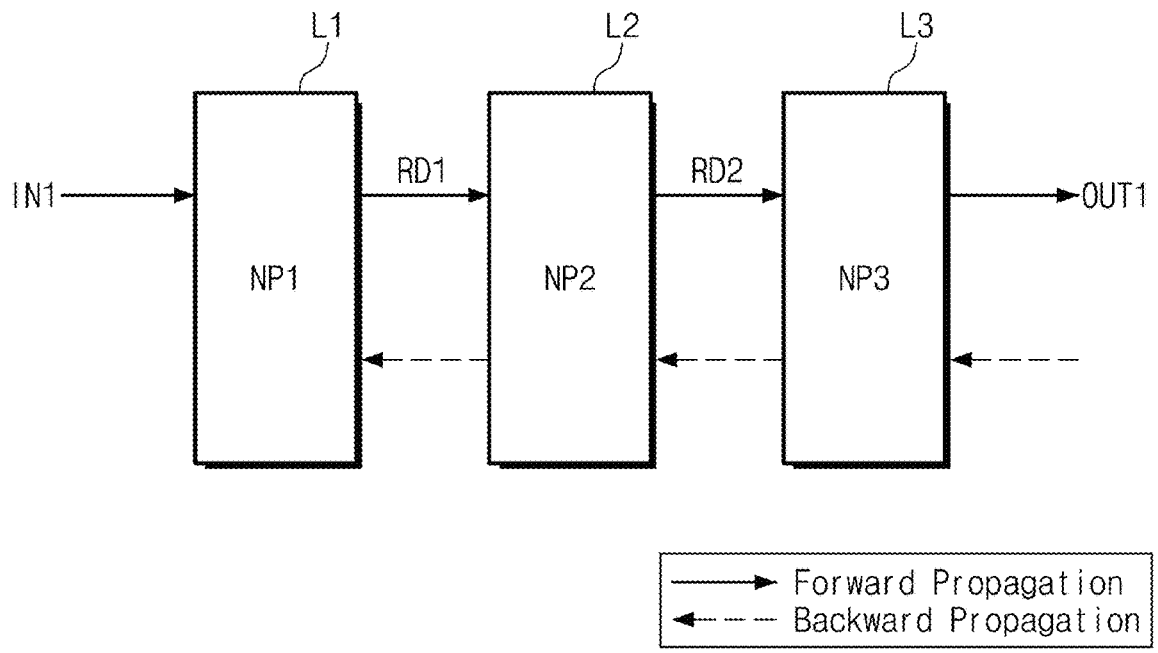
FIGS. 6A and 6B are diagrams illustrating an example of a deep learning operation according to an example embodiment of the inventive concepts.
Figure 6B:
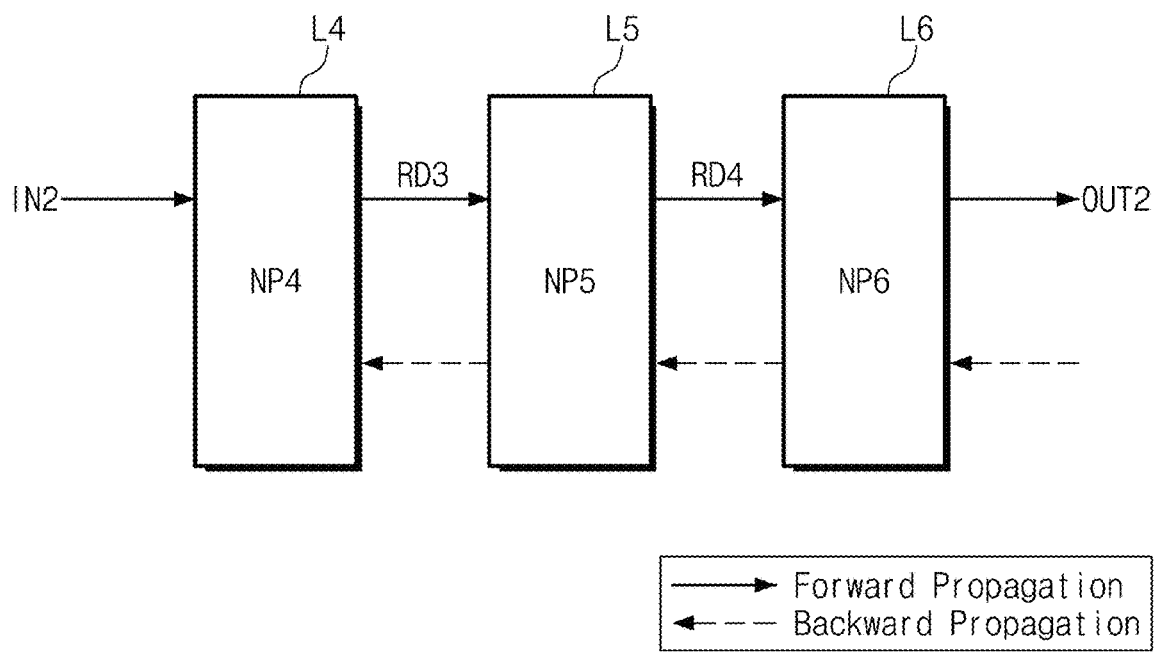
Figure 7:
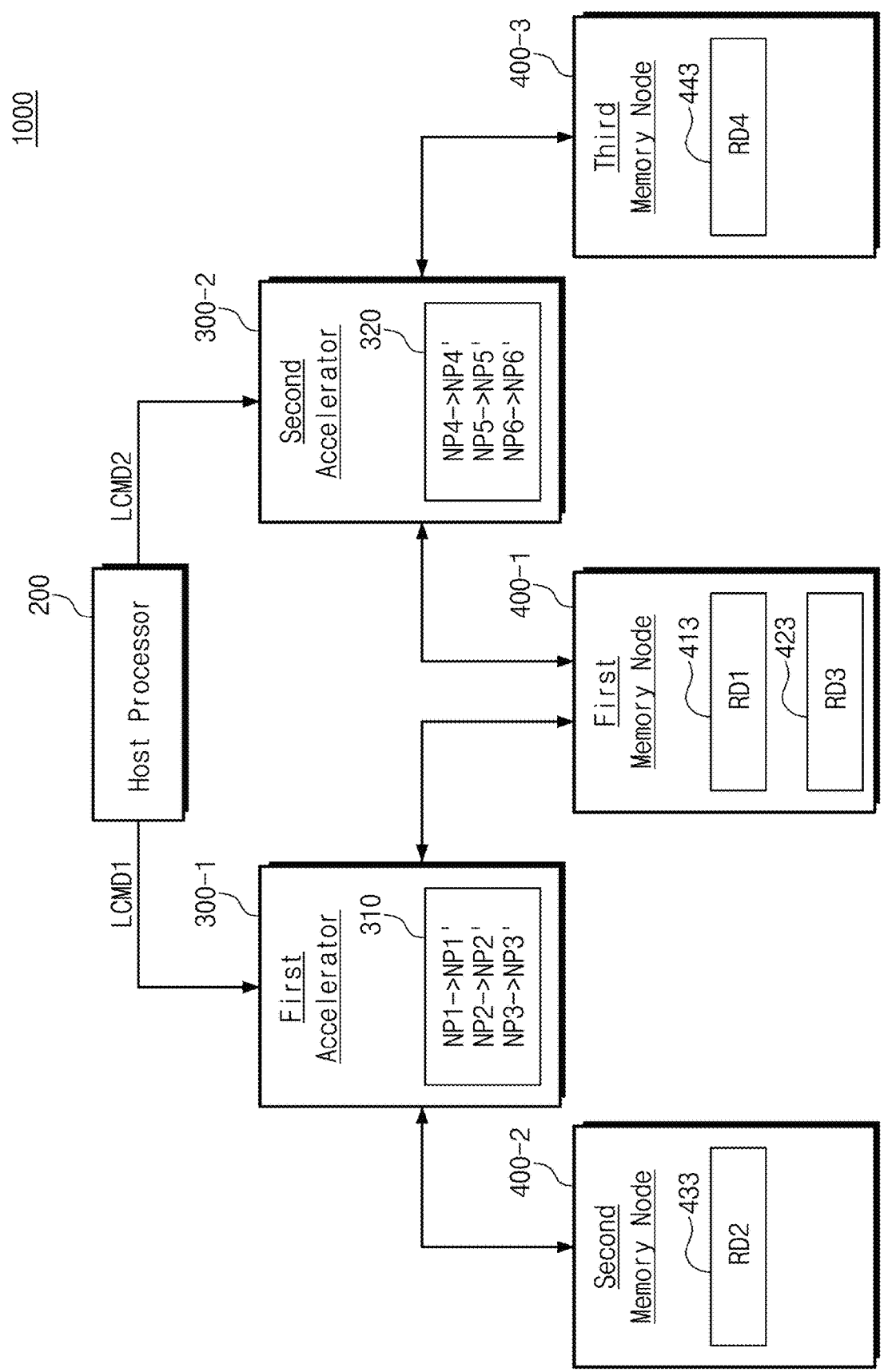
FIG. 7 is a diagram illustrating an operation of a computing system of FIG. 1 for deep learning of FIGS. 6A and 6B.

FIGS. 6A and 6B are diagrams illustrating an example of a deep learning operation according to an example embodiment of the inventive concepts. FIG. 7 is a diagram illustrating an operation of a computing system of FIG. 1 for deep learning of FIGS. 6A and 6B. In detail, FIG. 6A illustrates an example of a deep learning operation that is performed by the first accelerator 300-1, and FIG. 6B illustrates an example of a deep learning operation that is performed by the second accelerator 300-2.

Referring to FIGS. 6A and 7, the first accelerator 300-1 may receive a first learning command LCMD1 from the host processor 200. The first accelerator 300-1 may perform learning on first input data IN1 based on a neural network in response to the first learning command LCMD1. For example, the neural network may be based on a convolution neural network (CNN). However, the inventive concepts are not limited thereto. For example, the neural network may be based on various neural networks such as a recurrent neural network (RNN), a spiking neural network (SNN).

The neural network may first to third layers L1 to L3. The first to third layers L1 to L3 may respectively correspond to first to third neural network variables NP1 to NP3. The first accelerator 300-1 may perform learning on the first input data IN1 based on the first to third neural network variables NP1 to NP3. The first to third neural network variables NP1 to NP3 may be in advance stored in an internal memory 310 of the first accelerator 300-1.

First, the first accelerator 300-1 may perform a forward propagation operation on the first input data IN1. For example, the first input data IN1 may be transferred from the host processor 200 or may be transferred from the memory nodes 400-1 to 400-3. The first accelerator 300-1 may perform an operation on the first input data IN1 and the first neural network variables NP1 and may generate a first operation result RD1. The first accelerator 300-1 may store the first operation result RD1 in the first memory device 413 of the first memory node 400-1.

The first accelerator 300-1 may perform an operation on the first operation result RD1 and the second neural network variables NP2 and may generate a second operation result RD2. The first accelerator 300-1 may store the second operation result RD2 in a memory device 433 of the second memory node 400-2.

The first accelerator 300-1 may perform an operation on the second operation result RD2 and the third neural network variables NP3 and may generate first prediction data OUT1. The first accelerator 300-1 may compare the first prediction data OUT1 and a required result value to calculate an error.

The first accelerator 300-1 may perform a backward propagation operation such that the error is reduced. The first accelerator 300-1 may update the third neural network variables NP3 based on the second operation result RD2 stored in the second memory node 400-2. As such, the third neural network variables NP3 stored in the internal memory 310 may be updated to new third neural network variables NP3'. The first accelerator 300-1 may update the second neural network variables NP2 based on the first operation result RD1 stored in the first memory node 400-1. As such, the second neural network variables NP2 stored in the internal memory 310 may be updated to new second neural network variables NP2'. The first accelerator 300-1 may update the first neural network variables NP1 based on the first input data IN1. As such, the first neural network variables NP1 stored in the internal memory 310 may be updated to new first neural network variables NP1'.

Referring to FIGS. 6B and 7, the second accelerator 300-2 may receive a second learning command LCMD2 from the host processor 200. The second accelerator 300-2 may perform learning on second input data IN2 based on a neural network in response to the second learning command LCMD2.

The neural network may fourth to sixth layers L4 to L6. The fourth to sixth layers L4 to L6 may correspond to the first to third layers L1 to L3 of FIG. 6A, respectively. That is, a kind of an operation that is performed through the fourth to sixth layers L4 to L6 may be identical to a kind of an operation that is performed through the first to third layers L1 to L3. The fourth to sixth layers L4 to L6 may respectively correspond to fourth to sixth neural network variables NP4 to NP6. The second accelerator 300-2 may perform learning on the second input data IN2 based on the fourth to sixth neural network variables NP4 to NP6. The fourth to sixth neural network variables NP4 to NP6 may be in advance stored in an internal memory 320 of the second accelerator 300-2.

First, the second accelerator 300-2 may perform a forward propagation operation on the second input data IN2. For example, the second input data IN2 may be transferred from the host processor 200 or may be transferred from the memory nodes 400-1 to 400-3. The second accelerator 300-2 may perform an operation on the second input data IN2 and the fourth neural network variables NP4 and may generate a third operation result RD3. The second accelerator 300-2 may store the third operation result RD3 in the second memory device 423 of the first memory node 400-1.

The second accelerator 300-2 may perform an operation on the third operation result RD3 and the fifth neural network variables NP5 and may generate a fourth operation result RD4. The second accelerator 300-2 may store the fourth operation result RD4 in a memory device 443 of the third memory node 400-3.

The second accelerator 300-2 may perform an operation on the fourth operation result RD4 and the sixth neural network variables NP6 and may generate second prediction data OUT2. The second accelerator 300-2 may compare the second prediction data OUT2 and a required result value to calculate an error.

The second accelerator 300-2 may perform a backward propagation operation such that the error is reduced. The second accelerator 300-2 may update the sixth neural network variables NP6 based on the fourth operation result RD4 stored in the third memory node 400-3. As such, the sixth neural network variables NP6 stored in the internal memory 320 may be updated to new sixth neural network variables NP6'. The second accelerator 300-2 may update the fifth neural network variables NP5 based on the third operation result RD3 stored in the first memory node 400-1. As such, the fifth neural network variables NP5 stored in the internal memory 320 may be updated to new fifth neural network variables NP5'. The second accelerator 300-2 may update the fourth neural network variables NP4 based on the second input data IN2. As such, the fourth neural network variables NP4 stored in the internal memory 320 may be updated to new fourth neural network variables NP4'.

As described above, the computing system 1000 according to an example embodiment of the inventive concepts may perform learning on the input data IN1 and IN2 based on the accelerators 300-1 and 300-2 and the memory nodes 400-1 to 400-3. In this case, the accelerators 300-1 and 300-2 may perform learning on the input data IN1 and IN2 in parallel. Also, the accelerators 300-1 and 300-2 may perform learning without using a host resource (e.g., a host memory). As such, the computing system 1000 may perform learning on the input data IN1 and IN2 quickly.

An example is illustrated in FIGS. 6A and 6B as the neural network includes three layers, but the inventive concepts are not limited thereto. For example, the number of layers included in the neural network may be variously changed.

The description is given with reference to FIGS. 6A to 7 as an operation result calculated at one accelerator is not used at another accelerator, but the inventive concepts are not limited thereto. For example, unlike the description given with reference to FIGS. 6A to 7, the first accelerator 300-1 may perform an operation based on the third operation result RD3 calculated at the second accelerator 300-2. In this case, the third operation result RD3 may be transferred from the first memory node 400-1.

The description is given with reference to FIGS. 6A to 7 as an accelerator stores an operation result calculated through one layer in one memory node, but the inventive concepts are not limited thereto. For example, the first accelerator 300-1 may distribute and store the first operation result RD1 calculated through the first layer L1 in the first memory node 400-1 and the second memory node 400-2.

Figure 8:
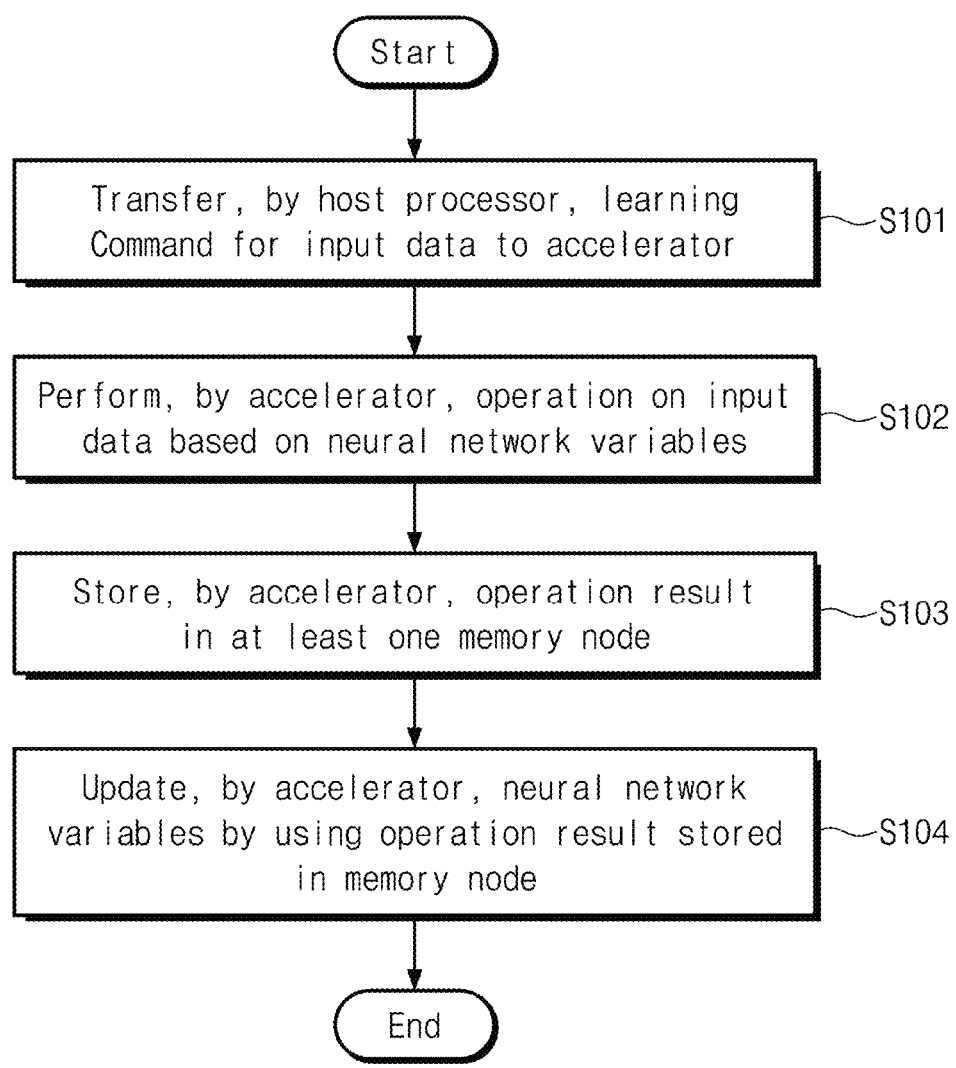
FIG. 8 is a flowchart illustrating an exemplary operation in which a computing system of FIG. 1 performs deep learning.

FIG. 8 is a flowchart illustrating an exemplary operation in which a computing system of FIG. 1 performs deep learning. Referring to FIGS. 1 and 8, in operation S101, the host processor 200 may transfer a learning command for input data to an accelerator. The host processor 200 may transfer the learning command to at least one of the accelerators 300-1 to 300-n.

In operation S102, the accelerator may perform an operation on the input data based on neural network variables. For example, the neural network variables may include a weight, a bias, etc. When the neural network is the convolution neural network (CNN), a weight may be a convolution filter.

In operation S103, the accelerator may store an operation result in at least one memory node. Without using a host resource, the accelerator may directly access the memory node to store the operation result. When the operation result is used at another accelerator, the operation result stored in the memory node may be transferred to the another accelerator. Afterwards, collective communication may be performed between the accelerators.

In operation S104, the accelerator may update the neural network variables by using the operation result stored in the memory node. To use the operation result stored in the memory node, the accelerator may directly access the memory node to fetch the operation result. In the case of updating the neural network variables by using the operation result, the collective communication may be performed between the accelerators. That is, the accelerator may update the neural network variables by using an operation result stored by the another accelerator.

As described above, the learning operation may be performed through operation S101 to operation S104. Afterwards, the computing system 1000 may perform inference on the input data based on the updated neural network variables.

Figure 9:
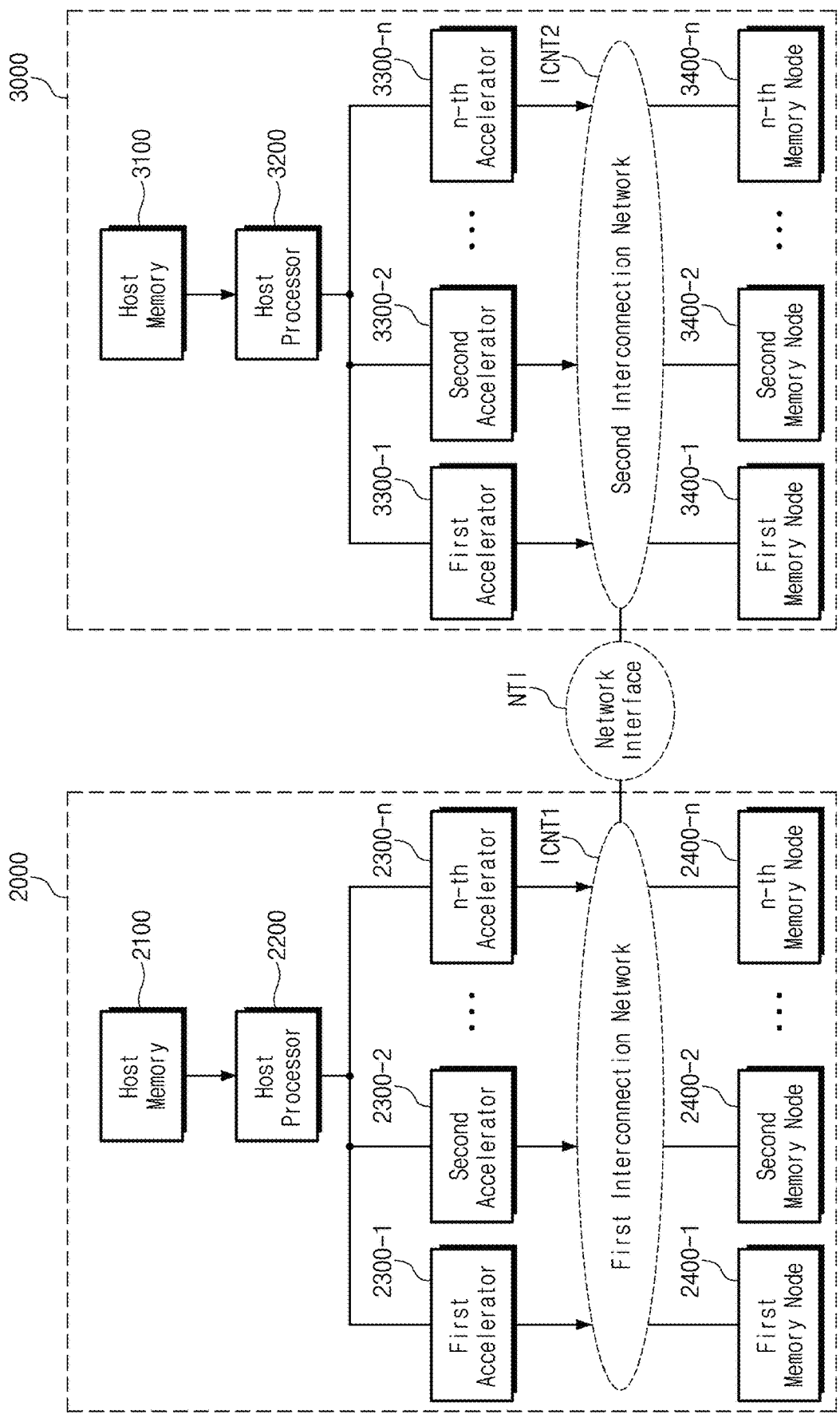
FIG. 9 is a block diagram illustrating how a computing system is expanded according to an example embodiment of the inventive concepts.

FIG. 9 is a block diagram illustrating how a computing system according to an example embodiment of the inventive concepts is expanded. Referring to FIG. 9, a first computing system 2000 and a second computing system 3000 may be connected through a network interface NTI. For example, the network interface NTI may be implemented based on a messages passing interface (MPI).

The first computing system 2000 may include a host memory 2100, a host processor 2200, a plurality of accelerators 2300-1 to 2300-n, and a plurality of memory nodes 2400-1 to 2400-n. The accelerators 2300-1 to 2300-n and the memory nodes 2400-1 to 2400-n may be connected through a first interconnection network ICNT1.

Operations of the host memory 2100, the host processor 2200, the accelerators 2300-1 to 2300-n, and the memory nodes 2400-1 to 2400-n may be identical or similar to the operations of the host memory 100, the host processor 200, the accelerators 300-1 to 300-n, and the memory nodes 400-1 to 400-n of FIG. 1.

The second computing system 3000 may include a host memory 3100, a host processor 3200, a plurality of accelerators 3300-1 to 3300-n, and a plurality of memory nodes 3400-1 to 3400-n. The accelerators 3300-1 to 3300-n and the memory nodes 3400-1 to 3400-n may be connected through a second interconnection network ICNT2.

Operations of the host memory 3100, the host processor 3200, the accelerators 3300-1 to 3300-n, and the memory nodes 3400-1 to 3400-n may be identical or similar to the operations of the host memory 100, the host processor 200, the accelerators 300-1 to 300-n, and the memory nodes 400-1 to 400-n of FIG. 1.

The accelerators 2300-1 to 2300-n of the first computing system 2000 may directly communicate with the accelerators 3300-1 to 3300-n of the second computing system 3000 through the network interface NTI. For example, the first accelerator 2300-1 of the first computing system 2000 may direct transfer data to the first accelerator 3300-1 of the second computing system 3000 through the network interface NTI.

When the accelerators 2300-1 to 2300-n and the accelerators 3300-1 to 3300-n directly transfer data, the memory nodes 2400-1 to 2400-n of the first computing system 2000 or the memory nodes 3400-1 to 3400-n of the second computing system 3000 may be used. For example, when the first accelerator 2300-1 and the first accelerator 3300-1 directly transfer data, the first memory node 2400-1 connected to the first accelerator 2300-1 or the first memory node 3400-1 connected to the first accelerator 3300-1 may be used.

As described above, an accelerator of the first computing system 2000 and an accelerator of the second computing system 3000 may transfer data without passing through the host processors 2200 and 3200. That is, the first computing system 2000 and the second computing system 3000 may perform communication through the network interface NTI to process data. As such, in the case of processing data by using the plurality of computing systems 2000 and 3000, data may be processed more quickly than in the case of processing data by using one computing system. That is, in the case of a huge amount of data, distributed processing and parallel processing may be performed on data by using the plurality of computing systems 2000 and 3000.

According to an example embodiment of the inventive concepts, a high-performance computing system capable of processing data quickly while minimizing the use of host resource may be provided.

Also, according to an example embodiment of the inventive concepts, a computing system that performs deep learning quickly and operates with a low power may be provided.

While the inventive concepts has been described with reference to exemplary embodiments thereof, it will be apparent to those of ordinary skill in the art that various changes and modifications may be made thereto without departing from the spirit and scope of the inventive concepts as set forth in the following claims.

What is claimed is:

1. A system comprising:
   a host processor;
   a plurality of accelerators configured to communicate with the host processor based on a communication interface; and
   a plurality of memory nodes distinguished from a host memory and is connected with the plurality of accelerators through an interconnection network,
   wherein the interconnection network is between the plurality of accelerators and the plurality of memory nodes and comprises data links through which the accelerators directly access the memory nodes without interaction with the host processor and the host memory,
   wherein a first accelerator of the plurality of accelerators directly accesses first and second memory nodes of the plurality of memory nodes through respective first and second of the data links of the plurality of data links of the interconnection network,
   wherein a second accelerator of the plurality of accelerators, connecting to the first memory node through a third data link, the second accelerator being different than the first accelerator, and
   wherein the first accelerator and the second accelerator directly exchange data with each other through the first memory node in which the first accelerator transfers data to the second accelerator through the first memory node, and the second accelerator transfers data to the first accelerator through the first memory node.

2. The system of claim 1, wherein a third of the data links is established between a second accelerator of the plurality of accelerators and the first memory node, and
   a fourth of the data links is established between the second accelerator and a third memory node of the plurality of memory nodes.

3. The system of claim 1, wherein the first memory node includes:
   a first memory module configured to store data transferred from the first accelerator through the first data link or to transfer stored data to the first accelerator through the first data link; and
   a second memory module configured to store data transferred from a second accelerator through the third data link or to transfer stored data to the second accelerator through the third data link.

4. The system of claim 3, wherein the first memory module includes a first direct memory access (DMA) engine allowing the first accelerator to directly access the first memory module, and
wherein the second memory module includes a second DMA engine allowing the second accelerator to directly access the second memory module.

5. The system of claim 3, wherein the first memory node further includes a protocol engine configured to transfer data stored in the first memory module and the second memory module in compliance with a particular protocol.

6. The system of claim 1, wherein the interconnection network includes a ring network, and
wherein each of the plurality of accelerators is configured to directly access at least two respective memory nodes.

7. The system of claim 1, wherein the first accelerator performs deep learning by using the first memory node and the second memory node.

8. The system of claim 1, wherein the first memory node includes:
a first direct memory access (DMA) engine allowing the first accelerator to directly access the first memory node;
a second DMA engine allowing the second accelerator to directly access the first memory node;
a first memory controller configured to control the first DMA; and
a second memory controller configured to control the second DMA.

9. The system of claim 1, wherein each accelerator is directly connected to a previous memory node and a next memory node in a ring arrangement, and each memory node is directly connected to a previous accelerator and a next accelerator in the ring arrangement and formed a closed loop.

10. A system comprising:
a host processor configured to generate a learning command for a plurality of input data;
a first accelerator configured to perform an operation on first input data of the plurality of input data based on neural network variables in response to the learning command and to generate a first operation result and a second operation result;
a second accelerator configured to perform an operation on second input data of the plurality of input data based on neural network variables in response to the learning command and to generate a third operation result and a fourth operation result;
a first memory node of a plurality of memory nodes configured to store the first operation result transferred directly from the first accelerator through a first data link, the plurality of memory nodes is distinguished from a host memory;
a second memory node configured to store the second operation result transferred directly from the first accelerator through a second data link; and
a third memory node configured to store the fourth operation result transferred from the second accelerator through a third data link,
wherein the first accelerator, without interaction with the host processor and the host memory, directly accesses the first memory node through the first data link and directly accesses the second memory node through the second data link, and
wherein the first memory node stores the third operation result transferred from the second accelerator through a fourth data link.

11. The system of claim 10, wherein the first memory node includes:
a first memory module configured to store the first operation result through the first data link; and
a second memory module configured to store the third operation result through the fourth data link.

12. The system of claim 11, wherein the first memory module includes a first direct memory access (DMA) engine allowing the first accelerator to directly access the first memory module, and
wherein the second memory module includes a second DMA engine allowing the second accelerator to directly access the second memory module.

13. The system of claim 11, wherein the first memory node further includes a protocol engine configured to transfer the first operation result stored in the first memory module to the first accelerator and the third operation result stored in the second memory module to the second accelerator in compliance with a particular protocol.

14. The system of claim 10, wherein the first accelerator updates the neural network variables by using the first operation result stored in the first memory node and the second operation result stored in the second memory node.

15. The system of claim 10, wherein the system includes a ring network,
wherein each of the accelerators is configured to directly access at least two respective memory nodes, and
wherein the first memory node includes:
a first direct memory access (DMA) engine allowing the first accelerator to directly access the first memory node;
a second DMA engine allowing a second accelerator to directly access the first memory node;
a first memory controller configured to control the first DMA; and
a second memory controller configured to control the second DMA.

16. A system comprising:
a host processor;
a plurality of accelerators configured to communicate with the host processor based on a communication interface; and
a plurality of memory nodes distinguished from a host memory and is connected with the plurality of accelerators through an interconnection network,
wherein the interconnection network is between the plurality of accelerators and the plurality of memory nodes and comprises data links through which the accelerators directly access the memory nodes without interaction with the host processor and the host memory,
wherein a first memory node of the plurality of memory nodes directly accesses a first accelerator through a first of the data links of the interconnection network and directly accesses a second accelerator of the plurality of accelerators through a second of data links of the interconnection network,
wherein the second accelerator is different than the first accelerator, and
wherein the first accelerator and the second accelerator directly exchange data with each other through the first memory node in which the first accelerator transfers data to the second accelerator through the first memory node, and the second accelerator transfers data to the first accelerator through the first memory node.

17. The system of claim 16, wherein the first memory node includes:
- a first memory module configured to store data transferred from the first accelerator through the first data link or to transfer stored data to the first accelerator through the first data link; and
- a second memory module configured to store data transferred from the second accelerator through the second data link or to transfer stored data to the second accelerator through the second data link.

18. The system of claim 17, wherein the first memory module includes a first direct memory access (DMA) engine allowing the first accelerator to directly access the first memory module, and
- wherein the second memory module includes a second DMA engine allowing the second accelerator to directly access the second memory module.

19. The system of claim 16, wherein the first memory node includes:
- a first direct memory access (DMA) engine allowing the first accelerator to directly access the first memory node;
- a second DMA engine allowing a second accelerator to directly access the first memory node,
- a first memory controller configured to control the first DMA; and
- a second memory controller configured to control the second DMA.

* * * * *